United States Patent
Pinschmidt (10) Patent No.: US 9,636,988 B2
(45) Date of Patent: May 2, 2017

(54) MOTOR VEHICLE

(71) Applicant: AUDI AG, Ingolstadt (DE)

(72) Inventor: Udo Pinschmidt, Gaimersheim (DE)

(73) Assignee: AUDI AG, Ingolstadt (DE)

( * ) Notice: Subject to any disclaimer, the term of this patent is extended or adjusted under 35 U.S.C. 154(b) by 114 days.

(21) Appl. No.: 14/718,791

(22) Filed: May 21, 2015

(65) Prior Publication Data

US 2015/0336453 A1 Nov. 26, 2015

(30) Foreign Application Priority Data

May 24, 2014 (DE) ........................ 10 2014 007 940

(51) Int. Cl.
*B60K 6/387* (2007.10)
*F16H 48/30* (2012.01)
*B60K 6/365* (2007.10)
*F16H 48/06* (2006.01)
*B60K 17/16* (2006.01)
(Continued)

(52) U.S. Cl.
CPC ............... *B60K 6/365* (2013.01); *B60K 6/387* (2013.01); *B60K 17/165* (2013.01); *F16H 48/06* (2013.01); *F16H 48/30* (2013.01); *B60K 1/00* (2013.01); *B60K 2001/001* (2013.01); *F16H 2048/364* (2013.01); *Y10S 903/902* (2013.01)

(58) Field of Classification Search
CPC .. B60K 6/485; B60K 6/387; B60K 2001/001; B60K 1/00; B60K 2006/4808; F16H 48/30; F16H 2048/364; Y10T 477/606
USPC .......................................................... 475/150
See application file for complete search history.

(56) References Cited

U.S. PATENT DOCUMENTS

| 8,663,051 B2 * | 3/2014 | Sten ........................ F16H 48/36 475/150 |
| 8,874,289 B2 * | 10/2014 | Tanba .................... B60K 6/387 180/6.2 |
| 2007/0123383 A1 | 5/2007 | Yokoyama et al. |

(Continued)

FOREIGN PATENT DOCUMENTS

| CN | 1428256 | 7/2003 |
| CN | 101386267 | 3/2009 |

(Continued)

OTHER PUBLICATIONS

European Search Report with respect to counterpart European patent application EP 15 00 1383.

(Continued)

*Primary Examiner* — Sherry Estremsky
(74) *Attorney, Agent, or Firm* — Henry M. Feiereisen LLC (57) ABSTRACT

A motor vehicle, includes a drive motor for driving the motor vehicle, at least one additional motor and at least one differential for distributing a torque generated by the drive motor and transmitted by a drive shaft to a driven differential element of the differential to two output shafts. The motor vehicle includes a coupling device which can be controlled by a control device, and in a first coupling state directly or indirectly couples the additional motor with an output shaft, thereby rendering the distribution of the drive torque to the output shafts dependent on an additional torque exerted by the additional motor, and in a second coupling state directly or indirectly couples the additional motor with the driven differential element.

17 Claims, 3 Drawing Sheets

(51) Int. Cl.
*B60K 1/00* (2006.01)
*F16H 48/36* (2012.01)

(56) References Cited

U.S. PATENT DOCUMENTS

| | | | |
|---|---|---|---|
| 2011/0269592 A1 | 11/2011 | Klomp | |
| 2012/0220413 A1 | 8/2012 | Yang | |
| 2015/0224867 A1* | 8/2015 | Nett | B60K 1/00 180/65.25 |
| 2016/0138695 A1* | 5/2016 | Tronnberg | F16H 48/36 475/150 |

FOREIGN PATENT DOCUMENTS

| | | |
|---|---|---|
| DE | 10 2006 031089 A1 | 1/2008 |
| DE | 102006031089 | 1/2008 |
| DE | 19680744 | 2/2011 |
| DE | 10 2009 56366 A1 | 6/2011 |
| DE | 2009059903 | 6/2011 |
| DE | 10 2010 036240 A1 | 3/2012 |
| DE | 102011085953 | 5/2013 |
| DE | WO 2014/033137 A1 | 3/2014 |
| FR | 2 930 483 * | 10/2009 |

OTHER PUBLICATIONS

Translation of European Search Report with respect to counterpart European patent application EP 15 00 1383.
Chinese Search Report issued on Jan. 22, 2017 with respect to counterpart Chinese patent application 201510264779.2.
Translation of Chinese Search Report issued on Jan. 22, 2017 with respect to counterpart Chinese patent application 201510264779.2.

* cited by examiner

MOTOR VEHICLE

CROSS-REFERENCES TO RELATED APPLICATIONS

This application claims the priority of German Patent Application, Serial No. 10 2014 007 940.6, filed May 24, 2015 pursuant to 35 U.S.C. 119(a)-(d), the disclosure of which is incorporated herein by reference.

BACKGROUND OF THE INVENTION

The invention relates to a motor vehicle including a drive motor for driving the motor vehicle, at least one additional motor and at least one differential for distributing a drive torque generated by the drive motor and transmitted to a driven differential element of the differential, to two output shafts.

The following discussion of related art is provided to assist the reader in understanding the advantages of the invention, and is not to be construed as an admission that this related art is prior art to this invention.

In order to improve the driving behavior of a motor vehicle it is known to use vehicle systems that distribute a torque provided by a drive motor between multiple axles of a motor vehicle, in particular between a front axle and a rear axle or between the wheels of an axle of a motor vehicle. One possible way to distribute torques between output shafts, wherein different rotational speeds of the output shafts are possible, is a differential or a differential transmission. In motor vehicles numerous different variants of differentials are used in order to for example prevent a redistribution of torques to a slipping wheel. Hereby purely passive systems such as simple limited slip differentials are known, however it is also known to brake one of the output shafts in a targeted manner in order to prevent the torque redistribution.

In order to improve the adaptability of the distribution of torques between the output shafts, so-called torque vectoring systems are also used which are capable of distributing torques between the drive axles in a targeted manner by way of a mechanical redistribution of a portion of the drive torque from the differential directly to the corresponding drive axle. For this the output shafts can be coupled to the drive shaft for example via a hydraulic or electromechanical coupling, for example with a stepper motor or a magnetic coupling.

A disadvantage in such systems for adjusting the torque distribution is that relatively complex mechanics are required. This increases the costs and the weight of the motor vehicle.

Also known are hybrid vehicles, which utilize an electric motor in order to increase the drive power of an internal combustion engine. For this an internal combustion engine, an electric motor and a drive shaft can for example be coupled via a planetary transmission, with which a torque, provided by the eclectic motor, is added to the torque of the internal combustion engine, which enables shifting the load point of the internal combustion engine. On one hand this can be used for increasing the drive power and on the other hand for reducing the fuel consumption of the internal combustion engine.

A disadvantage hereby is however that the electric motor and the further components increase the weight and the cost of the motor vehicle.

It would therefore be desirable and advantageous to provide an improved motor vehicle, which enables a controlled distribution of torques between different wheels or axles of the motor vehicle.

SUMMARY OF THE INVENTION

According to one aspect of the present invention, a motor vehicle includes a drive motor for driving the motor vehicle; at least one additional motor; at least one differential having a driven differential element, said differential being constructed for distributing a torque generated by the drive motor and transmitted by a drive shaft to the driven differential element between two output shafts, a control device, and a coupling device controllable by the control device to assume one of a first coupling state and a second coupling state, wherein in the first coupling state the coupling device directly or indirectly couples the additional motor with one of the output shafts, thereby rendering the distribution of the drive torque between the output shafts dependent on an additional torque exerted by the additional motor, and wherein in the second coupling state the coupling device directly or indirectly couples the additional motor with the driven differential element.

The present invention proposes to use an additional motor of the motor vehicle for adjusting the distribution of a drive torque between different output shafts and to couple the additional motor in a second coupling state of the coupling device directly or indirectly with the driven differential element, in order to provide additional torque which can subsequently be distributed via the differential, or to recuperate energy via the additional motor. In the motor vehicle according to the invention an additional motor can be used for different functions depending on the coupling state of the coupling device. Thus for example in case of fast curve driving the coupling device can be switched by the control device into the first coupling state, in which a targeted distribution of the drive torque of the drive motor between the output shafts and with this between the wheels is possible by controlling the additional motor. On the other hand, when for example accelerating or braking on an essentially straight road, the control device can switch the coupling device into the second coupling state, which enables using the additional motor for supporting the drive motor or for recuperating energy.

In the first coupling state the coupling device can decouple the additional motor from the driven differential element, and in the second coupling state it can decouple the additional motor from the output shaft. As an alternative the additional motor can be coupled with the driven differential element and with the output shaft in the first coupling state and can be decoupled from the output shaft in the second coupling state.

The corresponding coupling state can be determined in dependence on a multitude of motor vehicle parameters and environmental parameters detected by detection devices. Thus for example the gas pedal position, a yaw rate of the motor vehicle, the rotational speed of the wheels of the motor vehicle and the like can be detected and the coupling state can be determined in dependence on these parameters. However, the control device can also analyze information regarding a planned route, information of driver assistance systems relating to driving situations ahead and the like. In addition or as an alternative it is also possible to define the coupling state in dependence on an operating input of a user detected via an operating element. For example when driving off road the user can set the first coupling state and when driving in city traffic the second coupling state.

In the motor vehicle according to the invention in particular multiple differentials with a respective assigned additional motor can be used. In particular for each driven axle of the motor vehicle a separate differential with assigned additional motor can be provided. In addition or as an alternative a further differential with assigned additional motor for distributing a drive torque between different axles, in particular a front and a rear axle, can be used.

The coupling device can in particular be configured for form fitting coupling. This allows in particular providing a synchronization of the elements to be coupled by the coupling device. The coupling device can however also utilize a force fitting coupling, a hydraulic coupling or the like.

The drive motor can be an internal combustion engine. In addition or as an alternative the additional motor can be an electric motor. An electric motor can be used as an additional motor in particular in motor vehicles that have on-board voltage of greater than 30 volts, in particular 48 volts. As an alternative, electric motors can also be used as additional motors when a high-voltage on-board power system with a voltage of greater than 100 volts is present in the motor vehicle. The additional motor can in particular be a direct current motor, with which operation of the on-board power system of the motor vehicle is possible without an additional voltage converter. When the drive motor is an internal combustion engine and the additional motor is an electric motor, a hybrid function of the motor vehicle is thus provided in the motor vehicle according to the invention.

The motor vehicle can include an energy storage device with assigned charging device, wherein the control device is configured to have at least one operating mode in which the control device controls the coupling device for operation of the coupling device in the second coupling state and to control the charging device so that the charging device charges the energy storage device by recuperation. Hereby the additional motor can be operated as generator and the charging device can connect the motor with the energy storage device, in particular via a voltage transformer. An operating mode is provided for the motor vehicle in which the motor vehicle recuperates energy.

In the motor vehicle according to the invention, the additional motor can also be used for supporting the drive motor and in particular also as a backup for the drive motor for driving the wheels. When the coupling device is in the second coupling state, the motor vehicle according to the invention thus in particular provides the functionality of a hybrid vehicle.

The drive shaft can be connected with the driven differential element by a bevel gear, wherein a crown gearwheel of the bevel gear is connected with the driven differential element, which is in particular constructed as housing of the differential. Such an arrangement enables for example coupling a planetary transmission as differential to output shafts, which are assigned to the wheels of the motor vehicle and essentially extend in transverse direction of the vehicle, and at the same time to a conventional drive train, which has a shaft in longitudinal direction of the vehicle. The crown gearwheel can be screwed to, welded to or pressed with the housing.

It is however particularly advantageous when the crown gearwheel is connected with the driven differential element via a further coupling device, which is controlled by the control device, and in a first coupling state couples the crown gearwheel with the driven differential element and in a second coupling state separates the crown gearwheel from the driven differential element. The further coupling device enables separating the drive motor from the driven differential element and with this from the differential. This enables in particular driving the output shafts exclusively by the additional motor. This avoids the friction losses in the further drive train and losses due to the drive motor.

The differential can be configured as planetary transmission with a ring gear, which is in particular constructed as housing of the planetary transmission, a sun gear and at least one planet gear, which is supported by a planet carrier.

In a first coupling state the coupling device can couple the additional motor with the planet carrier. Hereby the drive shaft can be coupled with the ring gear, a first one of the output shafts with the at least one planet gear, and a second one of the output shafts with the sun gear. A coupling of the additional motor to the output shaft via the planet carrier enables a mechanically particularly simple coupling of the additional motor to the output shaft. This allows in particular achieving a sufficient transmission ratio between the additional motor and output shaft while at the same time using only little construction space.

Advantageously in a second coupling state the coupling device couples the additional motor with the ring gear. Such a coupling is in particular possible via a separate sprocket, a crown gearwheel or the like, which are fastened to the ring gear, i.e., pressed, welded or screwed. When in the first coupling state the additional motor is coupled with the planet carrier and in the second coupling state with the ring gear, the coupling device can be arranged directly in the region of the planetary transmission and can be constructed particularly compact, because the ring gear and the planet carrier are spatially directly neighboring each other.

As an alternative the differential can be configured as bevel gear differential or ball differential. Hereby the additional motor can in the first coupling state be coupled with the output shaft via a side shaft and in particular via a gear ratio. In the first coupling state the additional motor can be coupled with the output shaft as well as with the driven differential element, in particular a differential housing. As an alternative it is also possible to separate the additional motor in the first coupling state from the driven differential element. In the second coupling state in particular the side shaft can be decoupled from the output shaft, thus causing the side shaft to freewheel. As a result of the coupling of the additional motor with the driven differential element the additional motor can be used as generator and/or for supporting the power of the drive motor. As explained in more detail below, the drive motor can also be decoupled from the differential, thus allowing the motor vehicle to be exclusively driven by the additional motor, or respectively enables a recuperation operation without a braking of the drive motor.

The coupling device can be coupled with the driven differential element with a predetermined transmission ratio. In addition or as an alternative it is also possible that the coupling device is coupled with the output shaft via a gearing with a predetermined transmission factor. Via corresponding gearings for connection with the driven differential element or with the output shaft, rotational speeds or torques of the driven shaft or output shaft can be adjusted to the rotational speed range of the provided torque of the additional motor.

In a third coupling state the coupling device can in particular separate the additional motor from the driven differential element as well as from the output shaft. In this case the additional motor is decoupled from the entire drive train. Such a decoupling from the drive train prevents on one hand an energy loss as a result of the additional motor, when the additional motor is operated neither for providing torque nor for the purpose of recuperation, and on the other hand enables implementing protective functions for the additional motor and further electric components particularly easily due to this third coupling state. Thus it is possible that the control device is configured to control the coupling device for changing into the third coupling state when a detected operating parameter of the differential exceeds a predetermined threshold value. The operating parameter can in particular be detected by a sensor of the motor vehicle. However, the operating parameter can also be a parameter of the additional motor, in particular when the additional motor is an electric motor. The operating parameter can in particular be a rotational speed difference or a torque difference between the output shafts or a time derivative of the torque or rotational speed difference. Such a separating of the additional motor when the detected operating parameter exceeds a predetermined threshold value serves in particular as protection against overload of electrical components. High rotational speed differences or torque differences between the output shafts or sudden temporal changes of the latter can expose the additional motor itself or electrical components assigned to the additional motor, to strong stresses. This is prevented by the described shifting into the third coupling state.

As an alternative or in addition the control device can be configured to control the coupling device for operation in the first coupling mode, only when the rotational speed difference between the output shaft exceeds a further predetermined threshold value and when a connection condition, which is dependent on the operating state of the additional motor, is satisfied. A targeted distribution of torques is in particular possible when the additional motor is operated. When operating the additional motor for distributing torques, the coupling device can thus always be controlled for operation in the first coupling mode. When this is not the case the coupling device can be switched into the third coupling mode when the rotational speed difference exceeds the further predetermined threshold value. This prevents that minimal rotational speed differences between the output shafts, as they for example always occur in the case of an unevenly loaded vehicle, lead to a constant charging and discharging of energy storage devices. On one hand this reduces stress on the additional motor, and on the other hand reduces stress on further electrical components such as voltage transformers, batteries and the like.

The motor vehicle can have a further coupling device, which in a first coupling state couples the drive motor with the driven differential element and in a second coupling state separates the drive motor from the driven differential element. Hereby the further coupling device can be switched into the second coupling state by the control device, in particular when the coupling device is switched into the second coupling state. In this case the additional motor can drive the output shafts without further influence of the drive motor. This avoids friction losses and other losses due to the drive motor and further components of the drive train.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Figure 1:
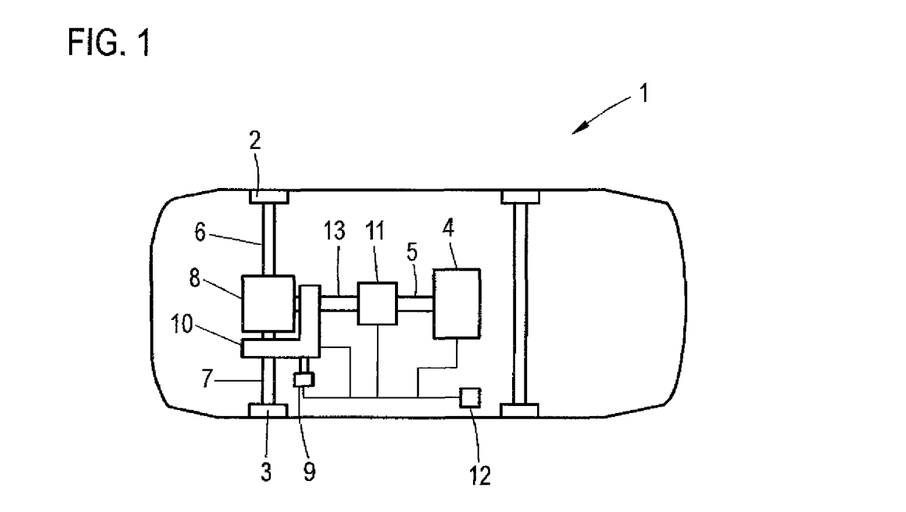
FIG. 1 shows a schematic representation of an exemplary embodiment of a motor vehicle according to the invention.

Turning now to the drawing, and in particular to FIG. 1, there is shown a motor vehicle 1 with a left and a right rear wheel 2, 3, which are driven during normal driving operation by the drive motor 4, which is an internal combustion engine. The drive torque provided by the drive motor 4 via the drive shaft 5 is distributed between the rear wheels 2, 3 or between the output shafts 6, 7 driving the rear wheels, via the differential 8, which is constructed as a planetary transmission.

In addition the additional motor 9, which is constructed as an electric motor, is provided in the motor vehicle 1. The additional motor 9 can provide different functions, depending on the coupling state of the coupling device 10 and the coupling state of the further coupling device 11, which can both be predetermined by the control device 12 via a vehicle bus. In a first operating mode of the motor vehicle the drive shaft 5 is coupled with the connecting shaft 13 via the further coupling device 11, which connecting shaft in turn is coupled with a driven differential element of the differential 8. The drive shaft 5 is therefore coupled with the driven differential element and a drive torque provided by the drive motor is distributed by the differential 8 between the output shafts 6, 7.

The additional motor 9 is separated from the output shaft 7 and also from the connecting shaft 13 by the coupling device 10 and with this from the driven differential element. In this operating mode of the motor vehicle the additional motor 9 has no function and neither a torque vectoring, i.e., a targeted distribution of torques of the drive motor 4 between the output shafts 6, 7, nor a recuperation or a support of the drive motor 4 by the additional motor 9 takes place.

When for example in difficult terrain or for stabilizing the motor vehicle, a targeted distribution of torques by the differential 8 is to be accomplished, the control device 12 controls the coupling device 10 in order to couple the additional motor 9 with the output shaft 7. In the following discussion it is assumed that all gearings have a transmission ratio of 1. As explained in more detail below this does not typically apply to a real motor vehicle. However, this assumption makes it easier to explain the functional principle.

As an example it is assumed that a torque of 1000 Nm is provided via the drive shaft 5. So long as the additional motor 9 freewheels, a torque of 500 Nm is thus correspondingly transmitted to the output shaft 6 as wells as to the output shaft 7. When now a torque of 100 Nm is generated via the additional motor 9 and additionally transmitted to the output shaft 7, the entire torque transmitted to the output shaft 7 is 600 Nm. Due to the function of the differential 8, however, the sum of the torques at the output shafts 6, 7 equals the torque of 1000 Nm provided by the drive shaft 5. Therefore only 400 Nm are now transmitted to the output shaft 6. In the described first coupling state of the coupling device 10 the torque and the rotational direction of the additional motor 9 thus determine how the torque transmitted by the drive shaft 5 to the differential 8 is distributed between the output shafts 6, 7.

During this time the control device 12 monitors multiple operating parameters of the differential by not shown sensors. When a protection condition is satisfied the control device 12 controls the coupling device 10 for switching into the third coupling state, which separates the additional motor 9 from the output shaft 7 as well as from the drive shaft 5. The protection condition is satisfied on one hand when the additional motor 9 is not controlled for generating a torque and at the same time the rotational speed difference between the output shafts 6, 7 is below a predetermined threshold value. This approach prevents a constant charging and discharging of an energy storage device assigned to the additional motor 9, and thus reduces stress on the additional motor 9 and the assigned electronics. On the other hand the protection condition is satisfied when the rotational speed of the additional motor 9 exceeds a predetermined threshold value, which at the same time means that the rotational speed difference between the output shafts 6 and 7 is substantial. This allows preventing damage to the additional motor 9.

When energy is to be recuperated during the drive of the motor vehicle 1 in order to charge energy storage devices in the motor vehicle 1 or when the internal combustion engine 4 is to be supported with an additional torque of the additional motor 9, the control device 12 controls the coupling device 10 so as to cause the coupling device 10 to assume a second coupling state. In the second coupling state the coupling device 10 decouples the additional motor 9 from the output shaft 7 and couples it to the additional shaft 13 and with this to the driven differential element. In this coupling state the torque of the drive motor 4 is added to the torque of the additional motor 9 before the total torque is distributed by the differential 8 between the output shafts 6, 7. Hereby the additional motor 9 can be controlled by the control device 12 so that it brakes the connecting shaft 13 and with this the drive shaft 5, thereby recuperating energy. On the other hand the additional motor 9 can be controlled by the control device 12 so that it increases the torque provided via the drive shaft 5, thereby making a greater torque available, for example when accelerating the motor vehicle. In addition it is also possible in this coupling state of the coupling device 10, that the further coupling device 11 separates the drive shaft 5 from the differential 8. In this case the motor vehicle 1 can be driven exclusively by the additional motor 9.

Figure 2:
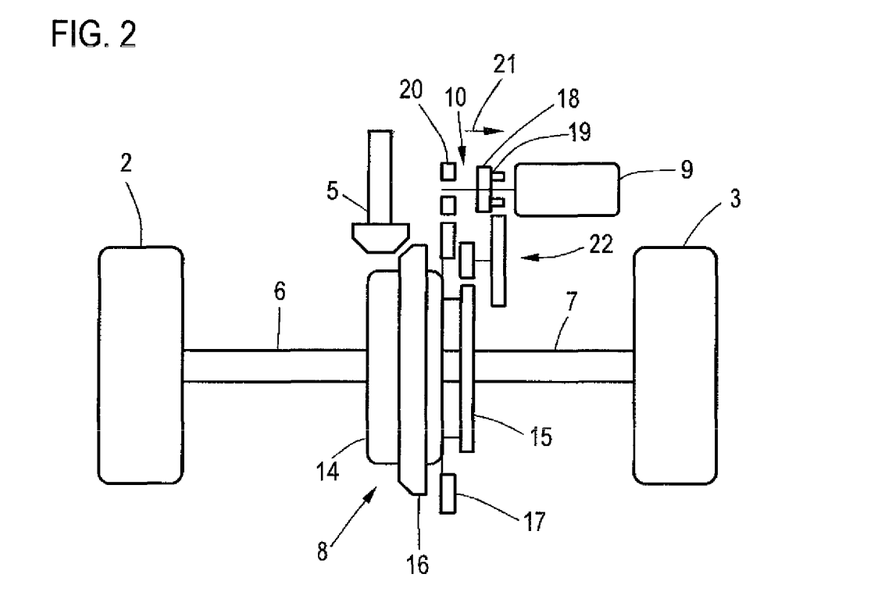
FIG. 2 shows a schematic detail view of a further exemplary embodiment of the motor vehicle according to the invention, wherein the coupling device is in the first coupling state.
Figure 5:
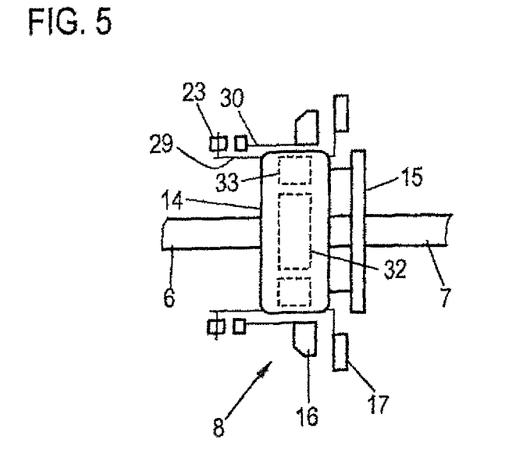

FIG. 2 shows a detail view of a further motor vehicle, in which a controlled torque distribution between the rear axles 2, 3 as well as an operation of an additional motor 9 for supporting a not shown drive motor or respectively for recuperation is possible. The coupling of the additional motor 9 by the coupling device 10 is not accomplished directly with the drive shaft 5 or the output shaft 7, but by coupling with different components of the differential 8. The differential 8 is configured as planetary transmission, wherein the planetary transmission includes a driven differential element 14, a ring gear, which is constructed as housing of the planetary transmission and in which a sun gear 32 shown in FIG. 5 and three planetary gears 33, two of which are shown in FIG. 5 rotate, which are supported by the planet carrier 15. The sun gear is coupled with the output shaft 6 and the planet gears are coupled with the output shaft 7.

On the housing of the planetary transmission a crown gearwheel 16 is arranged, which is coupled with the driven differential element 14, i.e., the housing, via a not shown further coupling device, which enables a decoupling of the housing from the crown gearwheel to thereby separate the differential from the not shown drive motor. The crown gearwheel 16 forms a part of a bevel gear, via which the differential 8 is coupled with the drive shaft 5.

In order to enable coupling of the additional motor 9 to the driven differential element 14, an additional sprocket 17 is screwed to the driven differential element 14. On the other hand, in order to enable coupling of the additional motor 9 with the planet carrier 15 and with the output shaft 7, the planet carrier 15 also has a sprocket.

The coupling device 10 includes a magnetic disc, which is supported on an axle in fixed rotative relationship with the axle, and which can be rotated by the additional motor 9. The disc 18 can be shifted along the axle by magnetic fields of not shown magnets. When no magnetic field is present, the disc 18 is in the center position shown in FIG. 4. In FIG. 2 the magnet is controlled by the not shown control device so that the disc is shifted in the direction of the gearwheel 19, as indicated by arrow 21, which gearwheel 19 is coupled with the planet carrier 15 via a gearing 22. In the coupling state shown in FIG. 2 the additional motor 9 is thus coupled with the output shaft 7 via the disc 18, the gearwheel 19, the gearing 22 and the planet carrier 15.

In this coupling state, as already explained with regard to FIG. 1, the distribution of the torque, which is transmitted to the differential 8 via the drive shaft 5, can be influenced on the output shafts 6, 7 by way of a torque of the additional motor 9. An advantage hereby is that when selecting appropriate transmission ratios between the additional motor and the drive shaft 7, the distribution of the torque can be strongly influenced already with relatively weak additional motors 9.

The additional motor 9 is an electric motor for operating a 48 volts on-board power system of the motor vehicle, which can generate a maximal torque of 14 Nm. In the following it is assumed that 250 Nm are transmitted via the drive shaft to the differential 8. Between the drive shaft 5 and the planetary transmission 8 a transmission ratio of 1:4 is set. Therefore a total torque of 1000 Nm is distributed between the output shafts 6 and 7 by the differential 8. Aided by the gearing 22, the total transmission ratio between the additional motor 9 and the output shaft 7 is 1:35, and therefore 490 Nm can be transmitted to the output shaft 7 by the additional motor 9, which outputs 14 Nm.

Due to the function of the differential 8, the torques on the output shafts 6, 7 must be added to the torque of 1000 Nm introduced by the drive shaft 5. At the same time the torque at the output shaft 6 has to be equal to the sum of the torque at the output shaft 7 and the torque introduced by the additional motor 9. These two conditions allow determining that with the explained parameters a total torque of 745 Nm is transmitted to the output shaft 6 and a torque of 255 Nm is transmitted to the output shaft 7. Thus by using a relatively weak additional motor, a strong change of the distribution of the torque can be effected by the differential 8.

Figure 3:
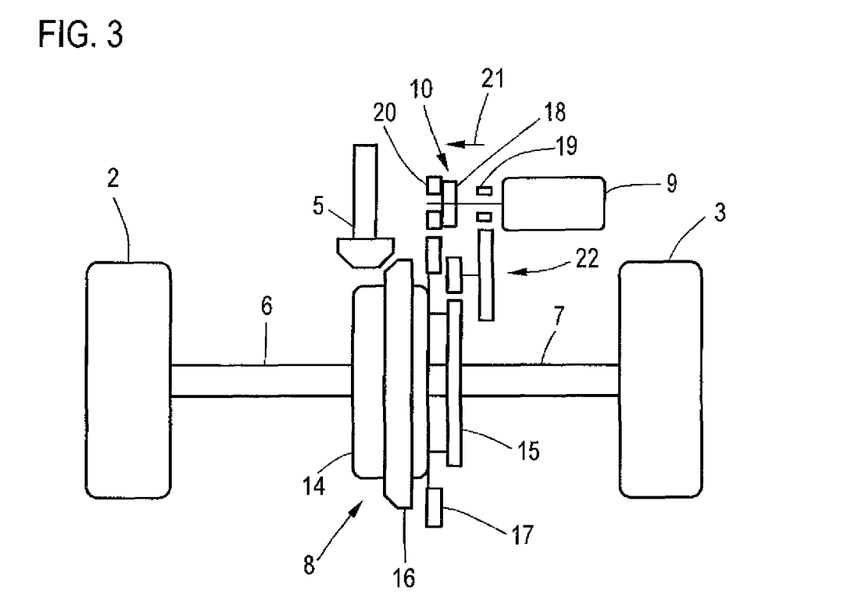
FIG. 3 shows the schematic detail view shown in FIG. 2, wherein the coupling device is in the second coupling state.

FIG. 3 shows a second coupling state of the coupling device 10. The disc 21 is pressed against the gearwheel 20 by a magnetic field, which is opposite to the magnetic field applied in FIG. 2. In this case the torque provided by the additional motor 9 is transmitted to the driven differential element 14 via the sprocket 17. By correspondingly dimensioning the transmission elements, the transmission ratio in this case is 1:20. When now the additional motor described above is used with a maximal torque of 14 Nm, a total torque of 280 Nm is provided for the output shafts 6, 7, whereby a torque of 140 Nm is transmitted to each of the two output shafts 6, 7. This additional torque for example allows significantly improving the dynamics during acceleration of the motor vehicle. In addition operation of the coupling device in the second coupling state enables an exclusively electric drive operation. For this the crown gearwheel 16 can be decoupled from the driven differential element 14, in particular by the further coupling device. With this the drive motor is completely decoupled from the differential 8 and with this from the output shafts 6, 7.

When such a purely electric drive operation is to be used frequently, a somewhat stronger additional motor 9 can advantageously be provided, for example with a maximal torque of 50 Nm with which, according to the calculation above, up to 500 Nm can be provided for each wheel in the purely electric drive operation.

In the second coupling state of the coupling device 9 shown in FIG. 3 a recuperation operation is thus possible in which, in particular when braking the motor vehicle, energy for charging an energy storage device is recuperated. For this the additional motor 9 is controlled by the control device so as to serve as generator.

Figure 4:
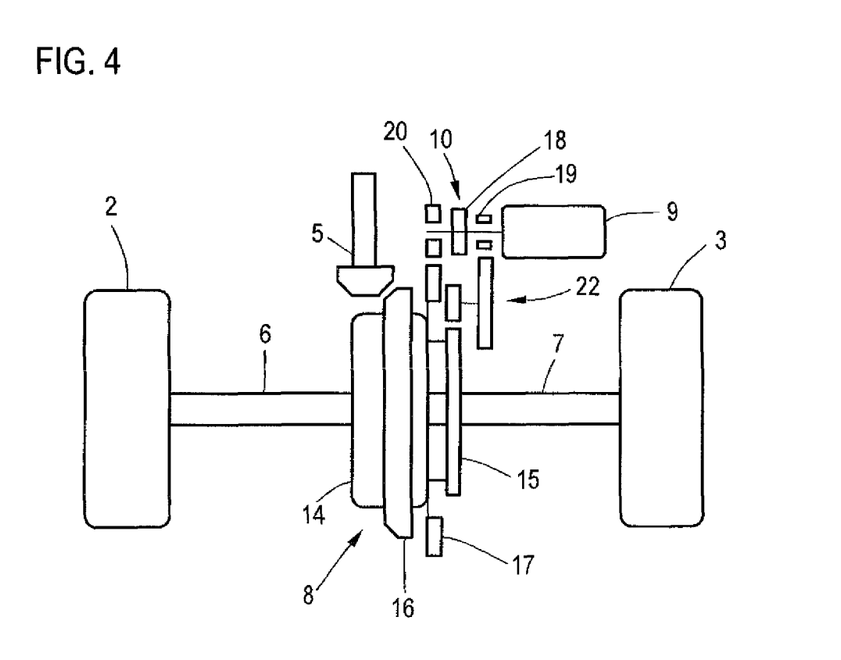
FIG. 4 shows the detail view shown in FIGS. 2 and 3, wherein the coupling device is in the third coupling state, FIG. 5 a schematic detail view of the differential shown in FIGS. 2 to 4 with the further coupling device arranged thereon.

FIG. 4 shows the coupling device 10 in a third coupling state, in which no external magnetic field for shifting the disc is applied. By not shown restoring elements the disc 18 is in this case returned into a center position in which it is neither in contact with the gearwheel 19 nor with the gearwheel 20. In this state the additional motor 9 is completely decoupled from the differential 8 and with this from the output shafts 6, 7 and the motor vehicle is driven exclusively by the drive motor, wherein no active redistribution of a torque to the output shafts 6, 7 occurs.

FIG. 5 shows a detail view of the differential 8 shown in FIGS. 2-4, in which the further coupling device 23 is shown. Beside the sprocket 17 a ring 29 is arranged on the driven differential element 14 of the differential 8, i.e., on the housing. On the ring 29 the further coupling device 23 is provided in order to couple the ring 29 with the ring 30 which is fixedly connected with the crown gearwheel 16. By linearly shifting the further coupling device 23 the ring 29 can be coupled with the ring 30, whereby the driven differential element 14 can be coupled with the crown gearwheel 16. When the rings 29, 30 are separated by the further coupling device 23, the crown gearwheel 16 is also separated form the driven differential element 14. Thus a complete decoupling of the differential 8 from the driven shaft 5 is possible.

Figure 6:
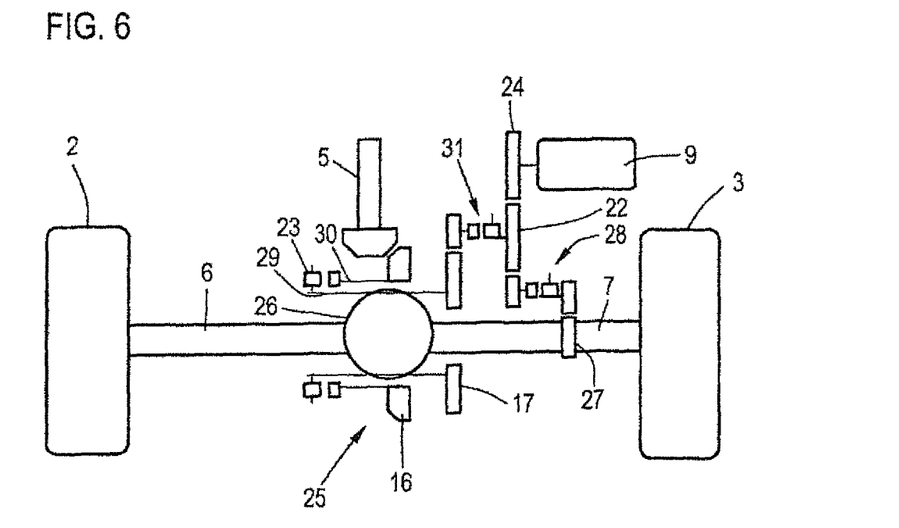
FIG. 6 shows a schematic detail view of a further exemplary embodiment of a motor vehicle according to the invention.

FIG. 6 shows a schematic detail view of a third exemplary embodiment of the motor vehicle according to the invention, wherein a bevel gear differential is used as differential 25. In this case the driven differential element 26 is the housing of the differential 25. By way of the rings 29, 30 and the further coupling device 23, the housing can be connected with the crown gearwheel 16 of a bevel gear, whereby the driven differential element 26 can be connected with the drive shaft 5. A significant difference to the construction described in connection with FIGS. 2-5 is the coupling of the additional motor 9 to the output shaft 7 or the differential 25. In the first coupling state the additional, motor 9 is coupled with the output shaft 7 via the gearwheel 24, the gearing 22, a first coupling element 28 of the coupling device and the gearwheel 27. In the second coupling state the additional motor 9 is connected with the driven differential element 26, i.e., the housing of the bevel gear differential, via the gearwheel 24, the gearing 22, the coupling element 31 integrated in the gearing 22 and the sprocket 17.

In the first coupling state of the coupling device the coupling element 28 connects the additional motor 9 with the output shaft 7 and the coupling element 31 separates the additional motor 9 from the driven differential element 26. In the second coupling state the coupling element 31 connects the additional motor 9 with the driven differential element 26 and the coupling element 28 separates the additional motor 9 from the output shaft 7.

In an alternative embodiment of the motor vehicle it would be possible to replace the coupling element 31 for a fixed connection. In this case the output shaft 7 and the driven differential element 26 would be connected with the additional motor 9 in the first coupling state.

Depending on the coupling state of the coupling device 10 and the further coupling device 11, 23, a multitude of operating modes can be realized with the motor vehicles shown in FIGS. 1-6. When the drive motor 4 is coupled with the differential 8, 25 via the further coupling device 11, 23 a torque vectoring is possible when operating the coupling device 10 in the first coupling state, a support of the drive motor 4 by the additional motor 9 or use of the additional motor 9 as drivetrain generator is possible when operating the coupling device 10 in the second coupling state, and a complete decoupling of the additional motor 9 from the drive train is possible when operating the coupling device 10 in the third coupling state.

When the further coupling device 11, 23 separates the drive motor 4 from the differential 8, a torque vectoring is possible when operating the coupling device in the second coupling state also when the drive motor 4 is decoupled. When the coupling device is operated in the second coupling state a purely electric drive of the motor vehicle or a purely recuperative operation can occur, without the drive train of the motor vehicle being also driven.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed is:

1. A motor vehicle, comprising:
   a drive motor for driving the motor vehicle;
   at least one additional motor;
   at least one differential having a driven differential element, said differential being constructed for distributing a torque generated by the drive motor and transmitted by a drive shaft to the driven differential element between two output shafts;
   a control device; and
   a coupling device controllable by the control device to assume one of a first coupling state and a second coupling state, wherein in the first coupling state the coupling device directly or indirectly couples the additional motor exclusively with one of the output shafts, thereby rendering the distribution of the drive torque between the output shafts dependent on an additional torque exerted by the additional motor, and wherein in the second coupling state the coupling device directly or indirectly couples the additional motor exclusively with the driven differential element.

2. The motor vehicle of claim 1, wherein the drive motor is constructed as an internal combustion engine.

3. The motor vehicle of claim 1, wherein the additional motor is constructed as an electric motor.

4. The motor vehicle of claim 3, further comprising an energy storage device with assigned charging device, wherein in at least one operating mode the control device is configured to control the coupling device to assume the second coupling state, and to control the additional motor and the charging device so as to charge the energy storage device by recuperation.

5. The motor vehicle of claim 1, wherein the drive shaft is connected with the driven differential element by a bevel gear, and wherein a crown gearwheel of the bevel gear is connected with the driven differential element.

6. The motor vehicle of claim 5, further comprising a further coupling device controlled by the control device to assume one of a first and a second coupling state, wherein the crown gearwheel is connected with the driven differential element via the further coupling device, wherein in the first coupling state of the further coupling device the further coupling device couples the crown gearwheel with the driven differential element, and in the second coupling state of the further coupling device, the further coupling device separates the crown gearwheel from the driven differential element.

7. The motor vehicle of claim 1, wherein the driven differential element is constructed as housing of the differential.

8. The motor vehicle of claim 1, wherein the differential is constructed as planetary transmission comprising a ring gear, a sun gear and at least one planet gear, which is supported by a planet carrier.

9. The motor vehicle of claim 8, wherein the ring gear is constructed as housing of the planetary transmission.

10. The motor vehicle of claim 8, wherein in the first coupling state of the coupling device, the coupling device couples the additional motor with the planet carrier.

11. The motor vehicle of claim 8, wherein in the second coupling state of the coupling device the coupling device couples the additional motor with the ring gear.

12. The motor vehicle of claim 1, wherein the coupling device is coupled with the output shaft via a gearing with a predetermined transmission ratio.

13. The motor vehicle of claim 1, wherein the coupling device is coupled with the driven differential element via a gearing with a predetermined transmission ratio.

14. The motor vehicle of claim 1, wherein the coupling device is configured to assume a third coupling state in which the coupling device separates the additional motor from the driven differential element and from the one of the output shafts.

15. The motor vehicle of claim 14, wherein the control device is configured to control the coupling device to assume the third coupling state when a detected operating parameter of the differential exceeds a predetermined threshold value.

16. The motor vehicle according to claim 15, wherein the control device is configured to control the coupling device to assume the first coupling state only when a rotational speed difference between the output shafts exceeds the predetermined threshold value and when a connection condition which is dependent on an operating state of the additional motor is satisfied.

17. The motor vehicle of claim 1, further comprising a further coupling device switchable into a first coupling state in which the further coupling device couples the drive motor with the driven differential element and a second coupling state in which the further coupling device separates the drive motor from the driven differential element.

* * * * *